May 23, 1933.　　　　C. R. MOHR　　　　1,910,707
WATER SYSTEM
Filed Sept. 3, 1931
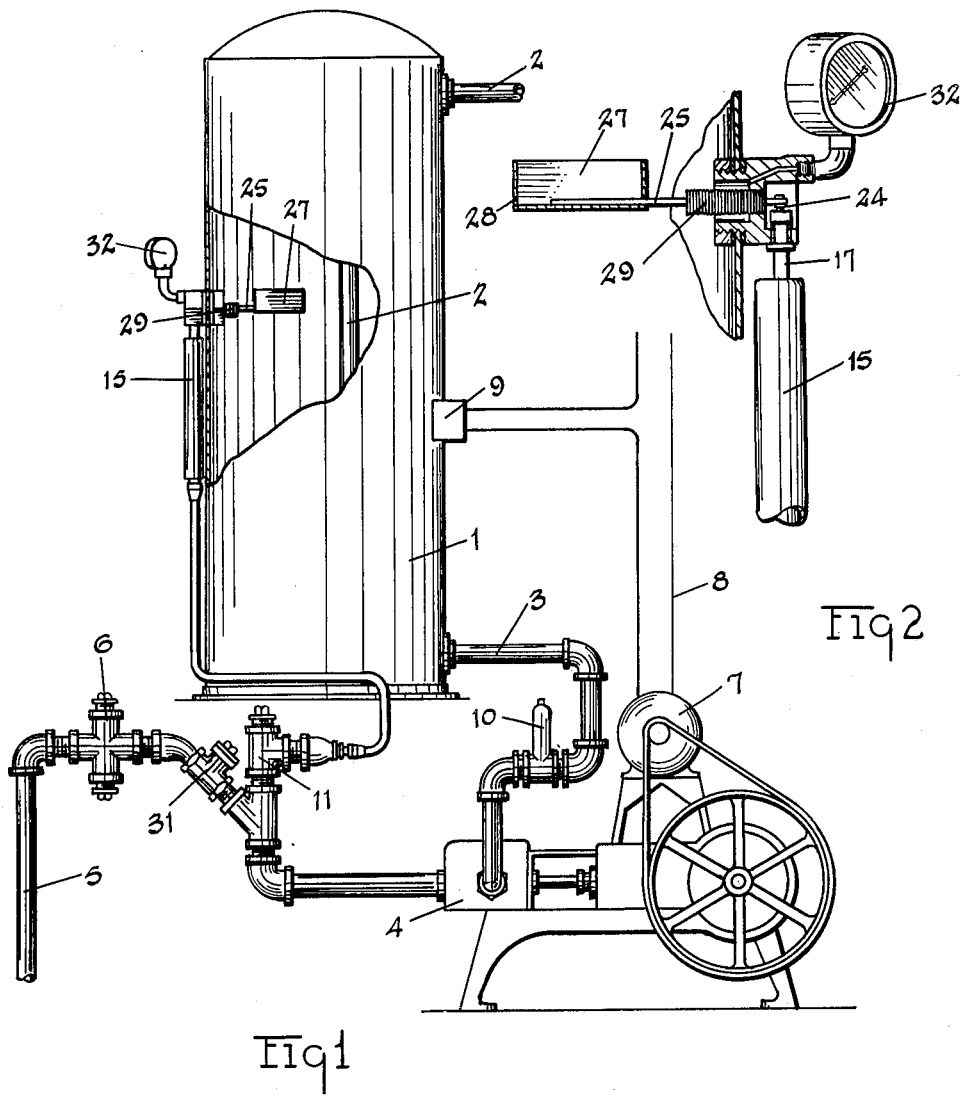
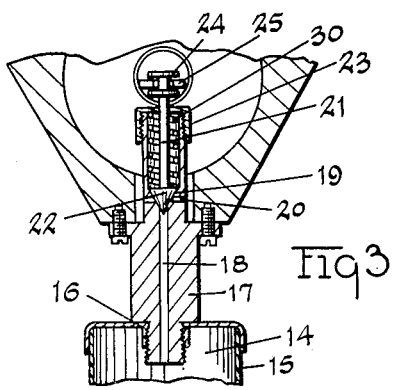

Patented May 23, 1933

1,910,707

UNITED STATES PATENT OFFICE

CLARK R. MOHR, OF JACKSON, MICHIGAN

WATER SYSTEM

Application filed September 3, 1931. Serial No. 560,983.

My invention relates to systems for the transmission of liquids, such as water, from reservoirs or wells to various delivery points or outlets through an intermediate reservoir or pressure tank. The invention particularly relates to a means for supplying a regulated amount of air to a pressure tank to maintain the advantage of the elasticity of air pressure on the surface of the water within the tank for subsequent water distribution from the tank. The invention also relates to a means for supplying a quantity of priming water to the pump at the commencement of the operation of the pump to raise the water from the well to the pressure tank.

The invention has for its object to provide a means for sustaining quantities of water above the level of the pump cylinder whereby the quantities of water may be released and directed into the pump cylinder upon the starting of operation of the pump. The invention also provides a means for introducing a regulated volume of air into the tank with and during the introduction of the water and subjecting the air to pressure by the rising surface of the water during the continued replenishing of the tank with water. The invention particularly provides a means for withdrawing air from within a chamber communicating with the pipes interconnecting the well or main reservoir with the pump so as to create a substantial vacuous condition in the chamber, sufficient in degree so as to hold in suspension desired quantities of water necessary to insure proper priming of the pump and for releasing the suspended water and allowing it to flow to the pump cylinder. The invention also provides means for introducing air into the chamber over a substantially fixed period of time when the pressure of the air within the pressure tank is less than its maximum pressure or at its minimum, whereby a certain volume content of air will be always present in the pressure tank of the system to maintain a substantially uniform high pressure and prevent pounding or hammering by the operation of the pump.

The invention consists in other features and advantages which will appear from the following description and upon examination of the drawing. Structures containing the invention may partake of different forms and may be varied in their details and still embody the invention. To illustrate a practical application of the invention I have selected a water system embodying the invention as an example of the various structures and details thereof that contain the invention and shall describe the selected system hereinafter, it being understood that variations may be made without departing from the spirit of the invention. The particular structure selected is shown in the accompanying drawing.

Fig. 1 illustrates a side view of the water system. Fig. 2 illustrates an enlarged view of a device for controlling the air valve. Fig. 3 is a view of a section of the valve for controlling the flow of air into the water system.

Individual water systems are commonly provided with an intermediate reservoir or pressure tank which is connected to a source of supply through a means, such as a pump, for lifting or moving the water from the source of supply to the pressure tank. A quantity of air which may be subjected to compression is maintained within the pressure tank above the surface of the water in order to exert a pressure on the water to lift or move it to various outlet points. Frequently, the pump is driven by an electric motor, which motor is controlled by a switch. The switch is operated by pressure devices well known in the art and which are sensitive to the increase or decrease of the air pressure within the pressure tank which is the resultant of replenishing or dispensing the water within the tank. Consequently, as the tank is emptied and the air pressure lowers by reason of the displacement or removal of the water as well as by reason of the escape of air from the tank with the water, the switch will close, starting the motor to drive the pump, to replenish the tank. It is necessary and desirable, therefore, to supply a priming fluid to the pump in order to insure immediate operation of the pump, particularly where the level of the water in the well or other source of supply is relatively low. My invention provides a device for trapping sufficient quantities of water within the system proximate to the pump, whereby such quantities of water may be immediately delivered to the pump upon the commencement of the operation of the pump. At the same time, or subsequent to the delivery of the priming water, a measured quantity of air will be introduced to the system when the resistance to the introduction thereof is at the lowest to maintain a sufficient air content within the tank which is subjected to compression by the operation of the pump. The device is controlled by an element which is sensitive and reacts to the replenishing or emptying of the tank of water and is preferably located so as to operate immediately prior to the commencement of the operation of the pump so as to supply the pump with the required priming liquid and immediately thereafter with the required air for the tank.

The device comprises a trap or head which is connected with a chamber in which a vacuous condition may be created of such degree as to cause suspension of priming water within the trap or head. The chamber may be opened or closed by a valve so as to permit the entry of air to within the chamber, thereby relieving the existent vacuous condition and permitting the escape of the suspended priming liquid to the pump and immediately subsequent delivery of air from the chamber to the pump which is forced into the pressure tank. A subsequent vacuous condition may be set up within the chamber by the withdrawal of the air from the chamber upon its closure which withdrawal of air is associated and common with the movement of the water by the pump from the source of supply. The chamber is preferably of a volume as determined by the volume of the particular pump and tank so that leakage of the valve will not materially affect the retention of the priming liquid in the head.

Thus, in the particular water system illustrated in the drawing, an intermediate reservoir or pressure tank 1 is provided, having an outlet pipe 2 and an inlet pipe 3. The outlet pipe 2 may be connected to various distributing points for delivering the water from within the tank. The inlet pipe 3 is connected through a pump 4 of a character well known in the art to a pipe 5 which communicates with a source of supply of water, such as a well. The pump 4 may be driven by a suitable electric motor 7, the circuit 8 of which may be controlled by a switch 9. The switch 9 is of a character well known in the art, being sensitive to the increase or decrease of the pressure within the tank to start and stop the motor 7. If desired, a sieve 6 may be located in the pipe line 5 so as to separate from the water such foreign materials as might clog the pump. A pressure equalizing chamber 10, well known in the art, may be provided in the pipe line 3 between the pump 4 and the tank 1 to insure proper and substantially silent operation of the pump.

As the water is withdrawn from the tank 1 through the pipe 2 quantities of air from within the tank will escape with the water and the level of the water within the tank will gradually lower and the air pressure within the tank 1 will correspondingly diminish until the switch 9 is actuated to close the circuit 8 through the electric motor 7. The motor 7 then commences to drive the pump 4, which moves the water through the pipe line 5 to replenish the tank 1 with water. which carries sufficient quantities of air to replenish the air content within the tank as will be described hereinafter.

In order to provide a quantity of priming water to the pump 4 to insure its immediate and proper operation upon its initial stroking, a trap pipe or head 11 is provided in the pipe line 5 between the source of supply and the pump 4. The head 11 is of sufficient dimension so as to be capable of retaining within itself sufficient quantities of water as would be required to prime the particular pump 4.

Preferably, the head 11 is located above the horizontal plane of the cylinder of the pump 4, so that the water retained in the head 11, upon being released will flow of its own weight to the cylinder of the pump 4. In order to suspend the priming water within the head 11, the head is connected through a pipe 12 to a container 15 having a chamber 14 in which may be created a vacuous condition of a sufficient degree to overcome the weight of the priming water within the head 11. One end of the container 15 may be secured in a suitable bracket or fitting 13 connected to the wall of the tank 1. The container 15 is provided with an opening 16 in which may be located a plug 17, preferably centrally bored as at 18 and having a tapered valve seat 19. The plug 17 is also bored as at 20 to connect the surface of the valve seat 19 with the exterior of the plug and to form a communicating passageway for air from the outside atmosphere to the chamber 14 through the bores 18 and 20. A valve member 22, of the same dimensions and shape as the valve seat 19 is located in the plug 17 and has a suitable stem 21 that extends through the valve cap 23. Thus, the stem 21 may be moved to lift the valve member 22 from the valve seat 19 and to control the movements of air through the bored portions 18 and 20 and thus control the pressure of air which is existent within the chamber 14 of the container 15. It will be seen that if there is a vacuous condition existing within the chamber 14 of the container 15 by reason of the exhaustion of air during a preceding pumping operation and the valve member 22 is subsequently moved to permit the entry of air through the bored portions 18 and 20, the priming fluid located in the head 11, which is held in suspension by the vacuous condition, will be permitted to escape toward the pump 4.

The valve stem 21 may be moved, such as by an arm 25 which is connected to it as at 24, to permit movement of the arm and the valve stem with respect to each other. The arm 25 may be provided with some suitable means which is reactive to the movement of the water within the tank. In the preferred form illustrated in the drawing, the arm 25 is connected to an open container or trough 27 which retains portions of the water, as the surface of the water is lowered in the tank by reason of its withdrawal from the tank 1 through the pipe 2. The weight of the water within the trough 27 causes the arm 25 to move, moving the valve member 22 as the surface of the water recedes. The arm 25 and the trough 27 are preferably located at positions in the tank so as to cause the movement of the valve member and the opening of the valve of the chamber 14 immediately before or at the same time as the switch 9 is operated to start the motor 7 to drive the pump, thus providing a priming fluid at the most effective time.

In order to maintain the valve of the chamber 14 open for a definite period of time during which time air may be drawn into the system so as to supply a measured quantity of air to the pressure tank 1 for compression purposes, the trough 27 is provided with an opening 28 of small dimension which permits the gradual and slow escape of the water retained within the trough, during which time air will be drawn into the system through the valve and chamber 14, thus permitting the entry of measured quantities of air into the system. As the water escapes from the trough, the weight of the water exerted on the arm will be gradually diminished and the arm 25 and the trough 27 will be returned to their initial positions by a suitable spring 29 which is connected to the arm, thus closing the valve of the chamber 14. A spring 30 may also be located about the stem 21 and adapted to move the valve head 22 against its seat 19 in a manner well known in the art.

As the pump 4 continues to move the water through the pipe 5 past the point of connection of the head 11, air will be drawn from the head 11 and its connected chamber 14 through the pipe 12. The air will continue to be withdrawn from the head and the chamber until the negative pressure established within the head and its connected chamber is equal to the draught of the pump. The air as it is withdrawn from the head 11 and its connected chamber 14 will be moved with the water through the pump 4 to the tank 1, thus maintaining within the tank 1 such quantities of air as may be compressed and requisite to the proper distribution of the water through the pipe 2, and creating within the chamber 14 a vacuous condition by reason of the closure of the valve of the chamber 14 and subsequent exhaustion of air.

In order to prevent the water that is located within the head 11 and its connected pipe from moving toward the source of supply through the pipe 5 when the pump ceases to operate, as in the case of slight leakage of air through the container 15 or pump 4 or by the weight of the water within the pipe 5, a suitable one-way valve 31 well known in the art may be located in the pipe line 5 between the head 11 and the well, which will automatically close when the pump discontinues moving the water through the pipe 5 toward the tank, thus trapping quantities of water on the pump side of the pipe 5, some of which quantities will be drawn into and held in suspension within the head 11 for subsequent releasement as a priming fluid.

If desired, a suitable pressure indicator 32 may be located on the tank proximate to the arm 25.

Thus the invention provides for introducing a regulated and measured quantity of air into the tank for a predetermined time during which the pressure of the air above the surface level of the water within the tank is substantially at its minimum. The invention also provides for maintaining a quantity of water in position for immediate delivery as a priming charge to the pump at its initial stroke.

I claim:

1. In a water supply system, a source of water supply, a tank, a pump for drawing water from the source of supply and directing it into the tank, a trap for locating water from the source of supply above the level of the inlet of the pump, an air valve for connecting the trap with atmospheric air and means for opening the air valve for a limited period of time during the receding of the level of the water within the tank.

2. In a water supply system, a source of water supply, a tank, a pump for drawing water from the source of supply and directing it into the tank, a trap connected to the pump, a chamber connected to the trap for retaining water within the trap, means actuated by the water within the tank for releasing the water within the trap.

3. In a water supply system, a source of water supply, a tank, a pump for drawing water from the source of supply and directing it into the tank, a trap, a chamber connected with the trap and means for varying the air pressure within the chamber to move the water in the trap.

4. In a water supply system, a source of water supply, a tank, a pump for drawing water from the source of supply and directing it into the tank, a chamber connected to the pump and having an opening, a variable weighted member for controlling the opening actuated by the movement of water within the tank to maintain a measured quantity of air in the tank.

5. In a water supply system, a source of water supply, a tank, a pump for drawing water from the source of supply and directing it into the tank, a container member located on the tank and actuated by the weight of the water within the container member, an air valve operated by the member for controlling the supply of air to the tank.

6. In a water supply system, a source of water supply, a tank, a pump for drawing water from the source of supply and directing it into the tank, a container member located in the tank and actuated by the weight of the water within the container member, the container member having an opening for permitting the escape of the water from within the container, an air valve operated by the member for controlling the supply of air to the tank.

7. In a water supply system, a source of water supply, a tank, a pump for drawing water from the source of supply and directing it into the tank, a container member located in the tank and actuated by the weight of the water within the container, an air valve connected to the member for the supplying of air to the tank and an elastic means for moving the container member for restricting the air supply to the tank.

8. In a water supply system, a source of water supply, a tank, a pump for drawing water from the source of supply and directing it into the tank, a container member located in the tank and actuated by the weight of the water within itself, the container member connected to an air valve, the container having an opening for permitting the water within the container to escape and a spring member connected to the container member for moving the container member for controlling the supply of air to the tank.

9. In a water supply system, a source of water supply, a tank, a pump for drawing water from the source of supply and directing it into the tank, an air measuring chamber, the chamber connected to the pump, and means controlled by the movement of the water within the tank for introducing a measured quantity of air to the tank from the chamber when the pressure within the tank is less than its maximum.

10. In a water supply system, a source of water supply, a tank, a pump for drawing water from the source of supply and directing it into the tank, a trap for locating water from the source of supply above the level of the inlet of the pump, an air valve for connecting the trap with atmospheric air on the supply side of the trap and means for opening the air valve according to the level of the water within the tank.

11. In a water supply system, a source of water supply, a tank, a pump for drawing water from the source of supply and directing it into the tank, a trap for entrapping water from the source of supply above the level of the inlet of the pump, a one way valve located on the supply side of the trap and adapted to close the supply line upon cessation of the pump, an air valve connected in the system intermediate the trap and the pump for connecting the trap with atmospheric air and means for opening the air valve according to the level of the water within the tank.

In witness whereof I have hereunto signed my name to this specification.

CLARK R. MOHR.